(12) United States Patent
Ostroverkhov et al.

(10) Patent No.: US 8,427,912 B2
(45) Date of Patent: Apr. 23, 2013

(54) SYSTEM AND METHOD FOR TRACKING IN SINGLE-BIT HOLOGRAPHIC DATA STORAGE

(75) Inventors: Victor Petrovich Ostroverkhov, Ballston Lake, NY (US); Brian Lee Lawrence, Niskayuna, NY (US); Xiaolei Shi, Niskayuna, NY (US); Zhiyuan Ren, Malta, NY (US); Zexin Pan, Madison, AL (US)

(73) Assignee: General Electric Company, Schenectady, NY (US)

( * ) Notice: Subject to any disclaimer, the term of this patent is extended or adjusted under 35 U.S.C. 154(b) by 591 days.

(21) Appl. No.: 12/346,279

(22) Filed: Dec. 30, 2008

(65) Prior Publication Data

US 2010/0165816 A1 Jul. 1, 2010

(51) Int. Cl.
*G11B 7/00* (2006.01)

(52) U.S. Cl.
USPC .................................. 369/44.26; 369/103

(58) Field of Classification Search ............... 369/44.41, 369/103, 53.19
See application file for complete search history.

(56) References Cited

U.S. PATENT DOCUMENTS

| | | | |
|---|---|---|---|
| 5,450,218 A | 9/1995 | Heanue et al. | |
| 5,510,912 A | 4/1996 | Blaum et al. | |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,889,907 B2 | 5/2005 | Roh | |
| 6,898,167 B2* | 5/2005 | Liu et al. | 369/103 |
| 7,020,054 B2 | 3/2006 | Kadlec et al. | |
| 7,388,695 B2 | 6/2008 | Lawrence et al. | |
| 2003/0031112 A1* | 2/2003 | Horimai | 369/244 |
| 2003/0090969 A1* | 5/2003 | Matsumoto et al. | 369/44.34 |
| 2005/0136333 A1 | 6/2005 | Lawrence et al. | |
| 2006/0073392 A1 | 4/2006 | Erben et al. | |
| 2006/0078802 A1 | 4/2006 | Chan et al. | |
| 2006/0133236 A1* | 6/2006 | Kim et al. | 369/44.41 |
| 2006/0140074 A1* | 6/2006 | Horimai | 369/44.28 |
| 2006/0215529 A1* | 9/2006 | Uno et al. | 369/103 |
| 2007/0097469 A1 | 5/2007 | Erben et al. | |
| 2007/0146835 A1 | 6/2007 | Erben et al. | |
| 2008/0055686 A1 | 3/2008 | Erben et al. | |
| 2008/0144145 A1 | 6/2008 | Boden et al. | |
| 2008/0144146 A1 | 6/2008 | Boden et al. | |
| 2009/0080315 A1* | 3/2009 | Kanamaru et al. | 369/103 |

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Paul Huber
(74) *Attorney, Agent, or Firm* — Jean Testa; Fletcher Yoder

(57) ABSTRACT

A system and method for controlling tracking in a holographic data storage system, including: impinging a beam on a holographic data disc, wherein the beam is reflected from a micro-hologram disposed within the holographic data disc; detecting the reflected beam from the holographic data disc by a multi-element detector; and analyzing a pattern detected by multi-element detector to generate a tracking error signal.

23 Claims, 6 Drawing Sheets

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2-5:00.

U.S. Appl. No. 12/346,378, filed Dec. 30, 2008, Xiaolei Shi et al.
U.S. Appl. No. 12/347,178, filed Dec. 31, 2008, Victor Ostroverkhov et al.
U.S. Appl. No. 12/347,211, filed Dec. 31, 2008, Xiaolei Shi et al.
U.S. Appl. No. 12/336,399, filed Dec. 16, 2008, John Erik Hershey et al.
U.S. Appl. No. 12/336,414, filed Dec. 16, 2008, John Anderson Fergus Ross et al.
U.S. Appl. No. 12/336,457, filed Dec. 17, 2008, John Anderson Fergus Ross et al.
U.S. Appl. No. 12/338,828, filed Dec. 18, 2008, John Anderson Fergus Ross et al.
U.S. Appl. No. 12/338,841, filed Dec. 18, 2008, John Anderson Fergus Ross et al.
U.S. Appl. No. 12/342,794, filed Dec. 23, 2008, John Anderson Fergus Ross et al.
U.S. Appl. No. 12/343,204, filed Dec. 23, 2008, Ruediger Kusch.

\* cited by examiner

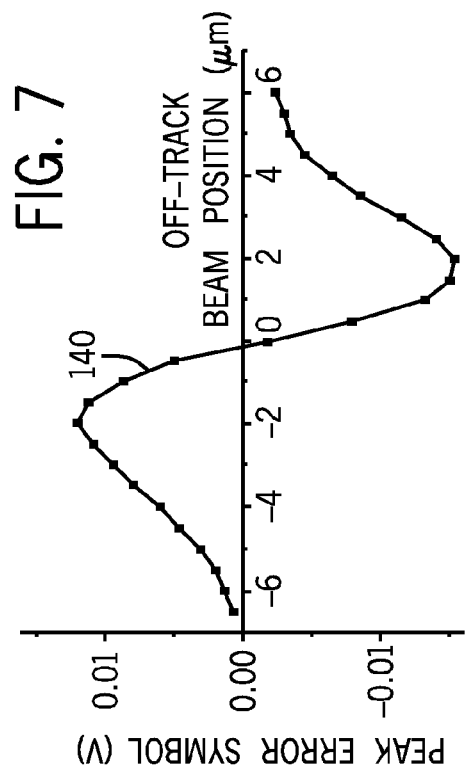
FIG. 7
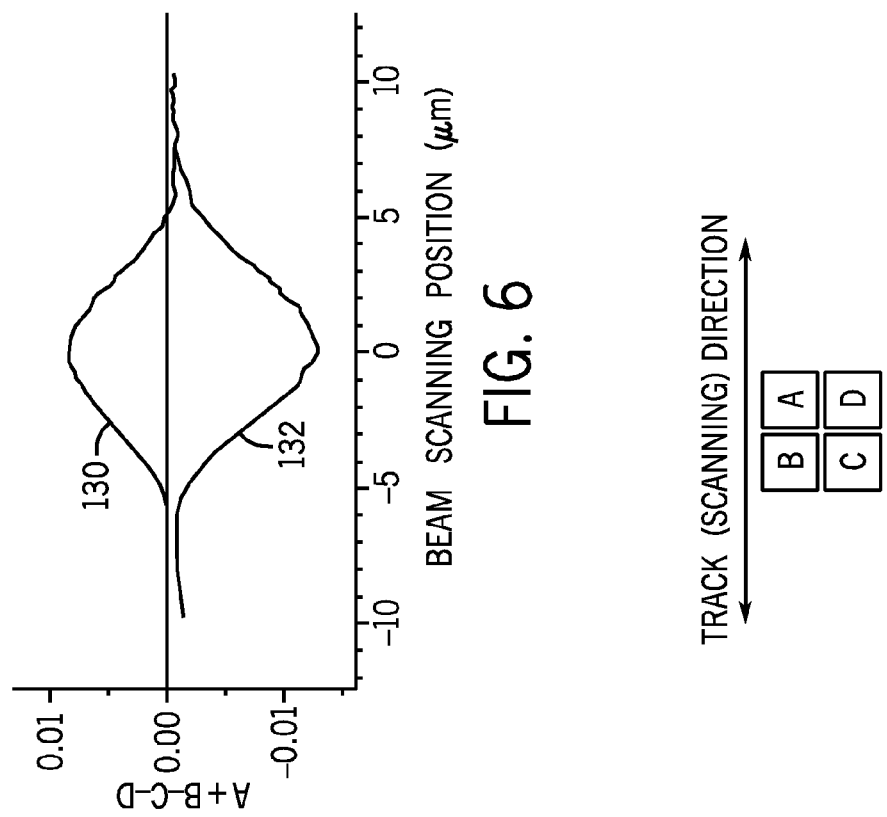
FIG. 6
FIG. 6A

SYSTEM AND METHOD FOR TRACKING IN SINGLE-BIT HOLOGRAPHIC DATA STORAGE

BACKGROUND

The present techniques relate generally to bit-wise holographic media. More specifically, the techniques relate to methods and systems for reading data stored on optical discs.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disk, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disc™ format, which is capable of holding about 25 GB in a single-layer disk, or 50 GB in a dual-layer disk. As resolution of video displays, and other technologies, continue to develop, storage media with ever-higher capacities will become more important. One developing storage technology that may better achieve future capacity requirements in the storage industry is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed signal beam proportional to the initial signal beam used to store the holographic image.

In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam. Accordingly, micro-holographic data storage is more similar to current technologies than page-wise holographic storage. However, in contrast to the two layers of data storage that may be used in DVD and Blu-ray Disk™ formats, holographic disks may have 50 or 100 layers of data storage, providing data storage capacities that may be measured in terabytes (TB). Further, as for page-based holographic data storage, each micro-hologram contains phase information from the signal.

The problem of beam tracking in multilayer optical data storage (ODS) media has been addressed before by allocating a special servo layer in the disk, which included either a surface groove pattern or specially positioned format holograms (servo marks) embedded in the data layer. An approach to tracking in multilayered holographic optical media utilizes a specially pre-mastered grooved tracking layer together with an additional different-color laser source designated to tracking. Direct extraction of the tracking error signal from the data layer of a multilayered HDS media has been addressed where the changes in shape of the diffracted beam due to off-center positioning of the reading beam on the track is utilized to generate a tracking error signal, as well as recording off-axis gratings to generate the satellite diffracted beams around the data diffracted beam to provide positioning information. A need exists for improved beam tracking in multilayer ODS media.

BRIEF DESCRIPTION

An aspect of the invention includes a method for controlling tracking in a holographic data storage system, including: impinging a beam on a holographic data disc, wherein the beam is reflected from a micro-hologram disposed within the holographic data disc; detecting the reflected beam from the holographic data disc by a multi-element detector; and analyzing a pattern detected by multi-element detector to generate a tracking error signal.

An aspect of the invention includes an optical media drive including: an optical excitation device configured to focus a laser beam on a micro-hologram in an optical disc; an optical detector configured to detect a reflected light beam from the micro-hologram in the optical disc; a processor configured to convert the reflected light beam into a tracking-error signal; and a tracking servo mechanism configured to control a radial position of the laser beam with respect to the optical disc, wherein the tracking servo mechanism is configured to receive the tracking error signal.

DRAWINGS

These and other features, aspects, and advantages of the present invention will become better understood when the following detailed description is read with reference to the accompanying drawings in which like characters represent like parts throughout the drawings, wherein:

FIGS. 6 and 6A is a plot of experimental push-pull signals (A+B)−(C+D) from a single grating scanned along the tangential direction (track) for different off-track positions of the probe beam in the radial direction in accordance with embodiments of the present technique;

FIG. 7 is a S-curve off-track error function defined as the peak radial push-pull signal, with the orientation of the detector elements with respect to the track direction also depicted in accordance with embodiments of the present technique;

Figure 9:
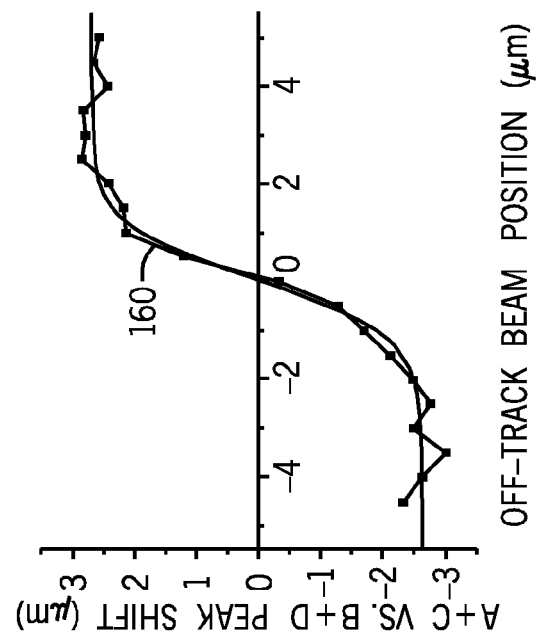
Figure 10:
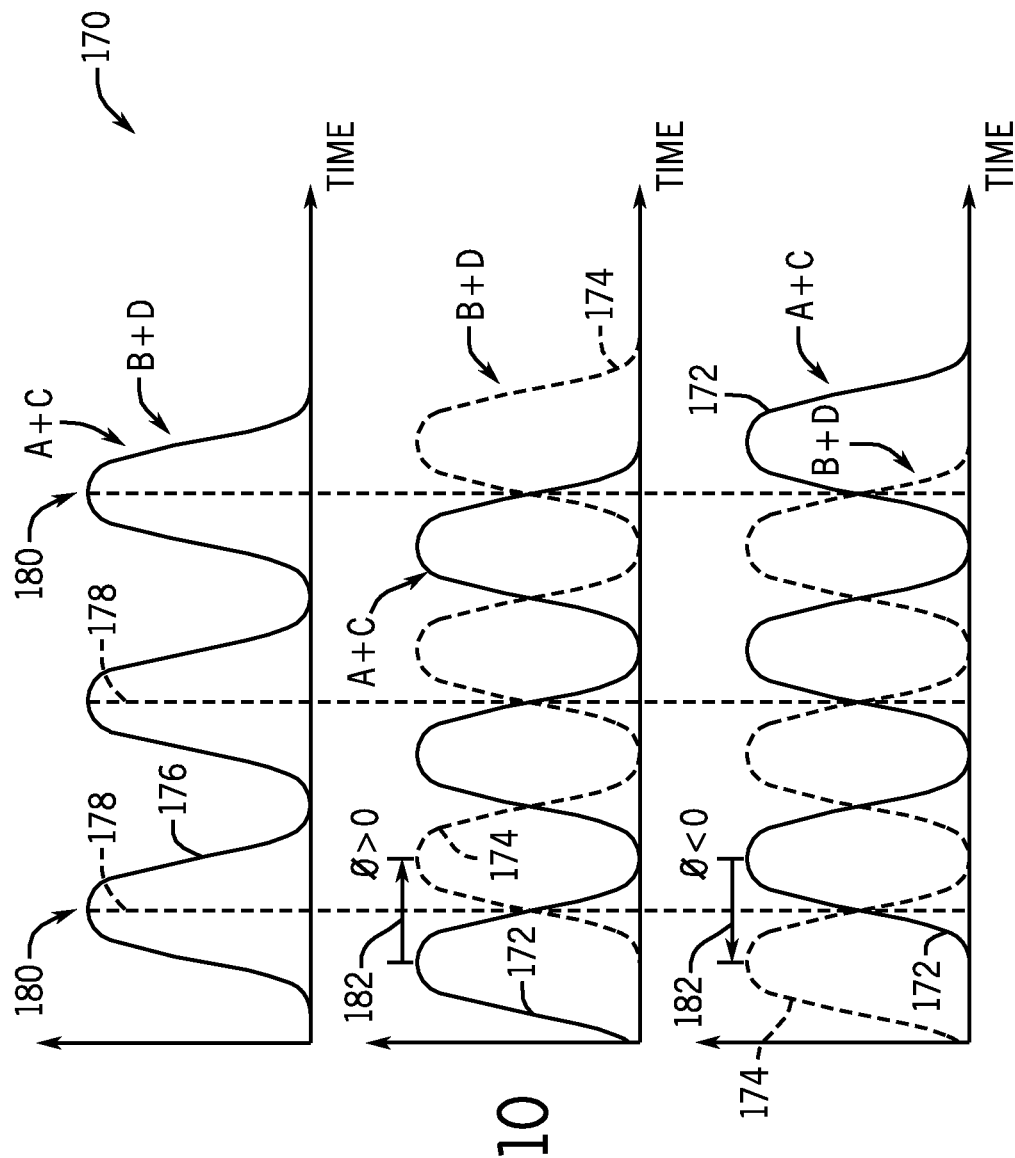

FIG. 9 is an S-curve off-track error function defined as (A+C) vs. (B+D) peak position shift vs. the off-track (radial) displacement of the probe beam in accordance with embodiments of the present technique; and FIG. 10 is representation of plots of (A+C) and (B+D) signals for determining a tracking (off-track) error signal via measuring the phase of each signal or the relative phase difference between the two phases in accordance with embodiments of the present technique.

DETAILED DESCRIPTION

This present technique involves a tracking system and method that can be incorporated into a holographic data storage system. Holographic data storage (HDS) media are developed as a next generation of optical data storage (ODS) due to the ability to generally utilize most or all of the volume of the HDS disc material. Up to 100 times increase in data capacity as compared with a single-layer DVD can be achieved, with the capacity potentially reaching 100s of GB to 1 TB of data on a 120 mm (diameter)×1.2 mm disc. For a discussion of various aspects of holographic data storage, see U.S. Pat. No. 7,388,695, incorporated herein by reference in its entirety.

One approach to the holographic storage format is the single-bit holographic systems in which information is represented by the presence (bit 1) or absence (bit 0) of a microscopic-sized diffraction grating (micro-hologram) recorded in the bulk of the material such that it reflects a fraction of light from a focused probe beam into a properly positioned detector. Due to high sensitivity of the diffraction efficiency of such gratings to the reading beam configuration, the data bits can be arranged in multiple layers in the medium so that each layer can be addressed independently from the others by an appropriate positioning of the reading optical head (stylus), which in turn results in the high media capacity. This is in contrast to other formats (CD, DVD, etc.) with less capacity, and which accommodate no more than a few spatially separated layers of data (typically one or two) and are basically surface-based media.

In spinning disk geometry, the data bits within each physical layer of micro-gratings are arranged in circular or spiral sequences as tracks. For a reliable readout of data, the stylus beam should be precisely positioned above the center of the track with precision dictated by the intertrack distance (in a manner similar to that in the surface-based media). In the surface media, the tracking error signal is extracted from changes in the beam diffraction patterns produced by reflection off of the edges of land and pit features in the data layers or of specially designed tracking grooves.

In a volumetric storage medium, the bits are recorded in the bulk of the material with focused laser beams that produce localized modulation of refractive index, which however do not generally exhibit sharp edge patterns as is the case in the surface media. However the efficiency, propagation direction, and beam profile of the backward reflected beam by a micro-hologram may be defined by the spatial overlap of the probe beam and the volume containing the micro-hologram pattern. Thus, diffraction off of the volume gratings may determine the off-track error signals that can be extracted. In write-once-read-many times (WORM) media, probe guiding marks such as grooves may be employed to write data marks into a blank disk.

However in prerecorded media (such as content distribution disks) and in preformatted WORM media (e.g., where data tracks and layers are pre-populated by marks and recording of data is accomplished by selectively erasing some of them), the data-carrying micro-holograms are generally already arranged in tracks and layers. In these cases, a present technique is to obtain tracking information from bits (which can carry useful information), thus reducing or eliminating need and complexity of having additional tracking holograms or surface tracking patterns, which would decrease useful capacity and/or complicate the production process. Other examples that utilize the tracking signals generated by a special tracking layer (e.g. using a dedicated tracking beam) and by the data micro-holograms (as taught by the present technique) are also possible.

In a single-bit HDS medium before applying channel coding and/or modulation, a bit of data is represented by the presence/absence of a single micro-grating that results in a high/low intensity level of the diffracted light, which can be assigned to 1 and 0 values. A micro-grating comprises a region of the medium with periodically modulated refractive index with periodicity that satisfies the Bragg condition to produce an appreciable diffracted wave. The gratings may be created with a pair of focused mutually coherent writing laser beams so that the index modulation generally follows a gradual profile vanishing toward the edges of the grating. To achieve a high contrast between 1 and 0 signal levels, the diffraction efficiency of each "on" bit should be large or maximized, which typically happens when the readout beam is precisely aligned centered on the micro-grating. As the reading beam position shifts away from the center of the grating, the diffraction efficiency drops off as the overlap between the grating and the beam intensity profiles decreases. However, even before a significant change in the diffracted efficiency occurs, the diffracted beam may undergo a detectable change in the propagation direction that originates from the asymmetry of the beam and grating mutual positions.

The present technique is directed to generating a tracking error signal from the data bits and/or formatting bits in single-bit holographic data storage (HDS) media. Deviation of the reflected signal beam from its nominal direction that occurs when the reading beam is misaligned with respect to the micro-grating center is detected. A multi-channel (e.g., four-channel) optical detection scheme facilitates extraction of push-pull signals that can be used as tracking error signals in the tracking servo loop of the optical media player or drive. The differential amplitude and phase signals may be demonstrated in single-bit HDS systems.

Thus, the technique may obtain a tracking error signal from individual bits (data or auxiliary/formatting) in a multilayer single-bit HDS systems, reducing the need in a special alignment layer either in the form of grooved surface (which may complicate readout and/or production process) or as a separate layer/subset of volume diffracting elements (that would consume the capacity of the medium), for example. Thus, the present technique can result in a simplified format for the HDS media, as well as increased useful capacity of such media.

In implementation, the change of the diffracted beam propagation that transforms into a detectable shift of the beam image spot across the detector upon scanning over a grating representing a bit of data is evaluated. This signal beam (reflected data beam) movement (deflection) across the detector is correlated with the position of the reading beam (data beam) with respect to the grating center (i.e., for tracking, the reflected data beam is interpreted to indicate the offset to the left or right from the center of the micro-hologram). This position, when detected with an appropriate photodetector, can be converted into the off-track error signal and fed back into the servo loop to compensate for the stylus positioning error. Detection of such beam motion may be easier and more robust than that of the beam shape, for example. Again, in certain embodiments, the approach may be employed without additional surface patterning or other specialized servo layer to perform tracking.

Figure 1:
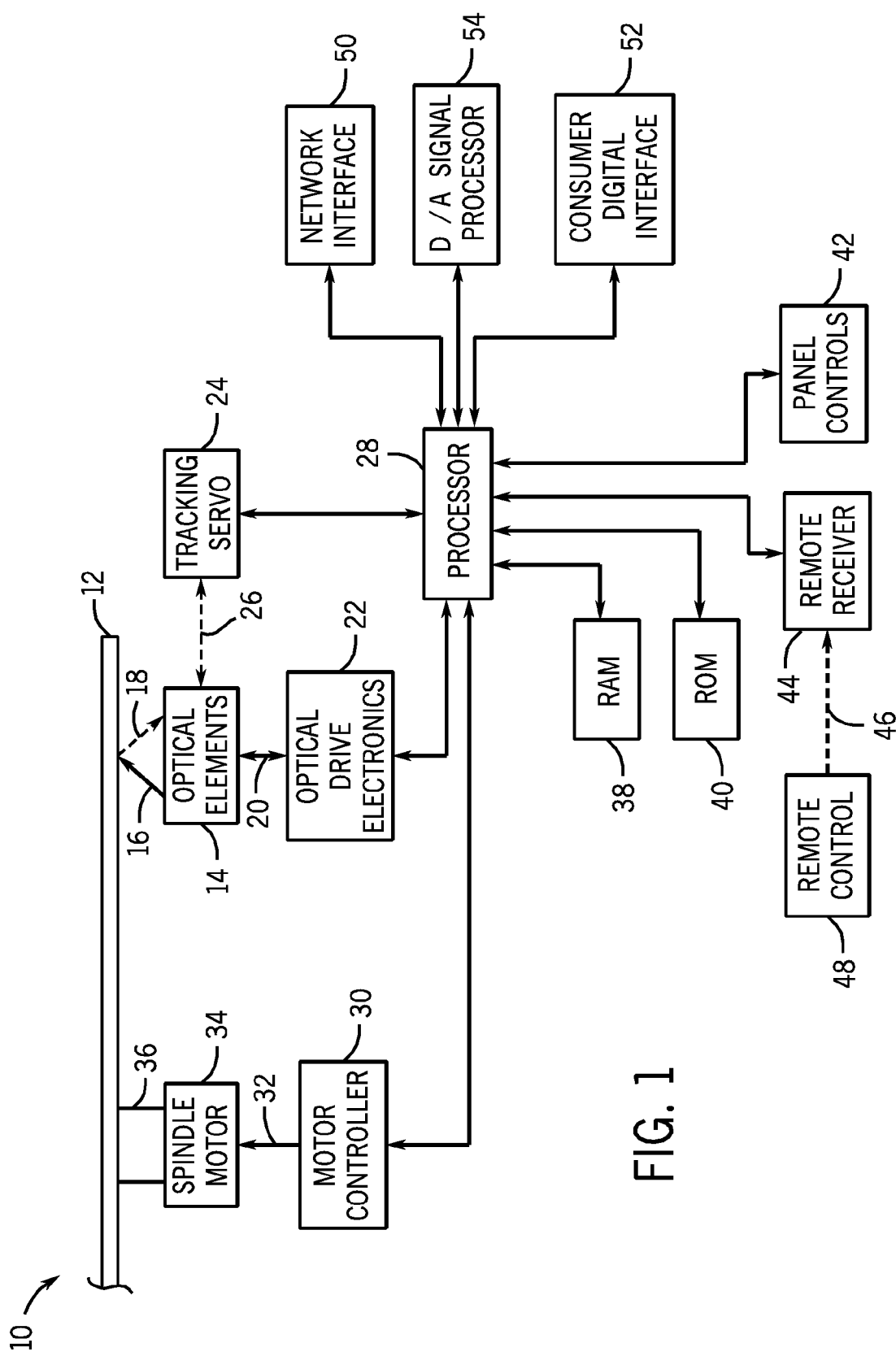
FIG. 1 is a schematic diagram of an optical disc reader in accordance with embodiments of the present technique.

In sum, the technique utilizes the beam deflection from the backward direction that occurs as the readout beam travels across each data bit hologram along and/or across the track of data—the effect that is a consequence of diffraction of a tightly focused (e.g., Gaussian) beam from a microscopic-sized volume grating of modulated refractive index. It should be noted that the read beam may be considered a data beam or signal beam. In certain instances, the read beam may be considered a data beam and a reflected read beam may be considered a signal beam, and so on. Advantageously, in embodiments, the technique may utilize a reflected read/data beam and not a separate tracking beam for tracking, thus reducing or eliminating the need for a tracking beam or a dual beam system An Optical Disk Player/Drive Turning now to the drawings, FIG. 1 is an optical drive system 10 that may be used to read data from optical storage discs 12. The data stored on the optical data disc 12 is read by a series of optical elements 14, which project a read (data) beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
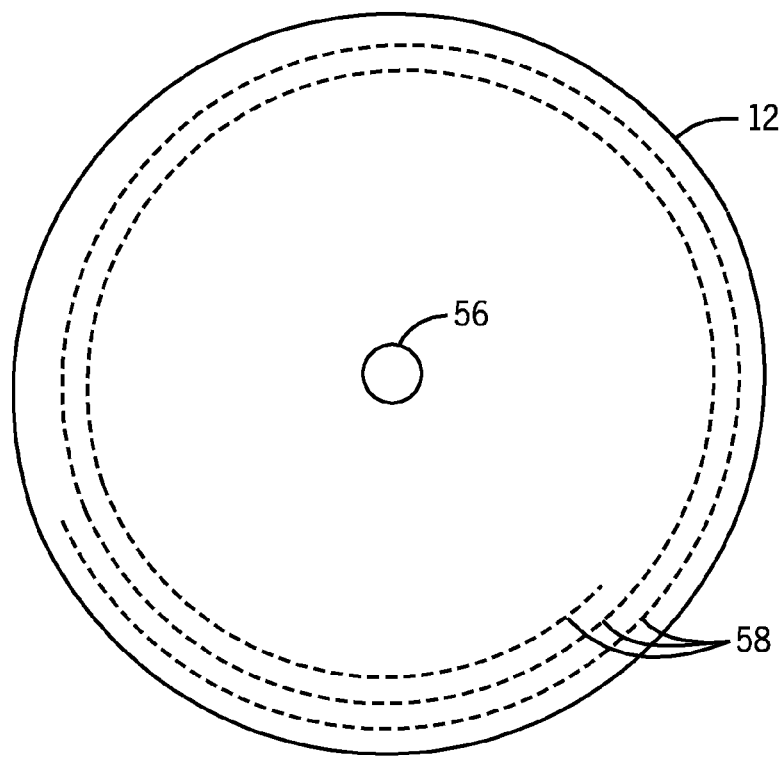
FIG. 2 is a top view of an optical disc that may be used in embodiments of the present technique.

The reader 10 may be used to read an optical data disc 12 containing data as shown in FIG. 2. Generally, the optical data disc 12 is a flat, round disc with one or more data storage layers embedded in the bulk of the disk material. A protective coating may be a transparent plastic, such as polycarbonate, polyacrylate, and the like In the case of a holographic medium, the material of the disk may be functional material that actively changes in response to recording light to produce a data mark hologram. The data bits represented by micro-holograms may be grouped into any number of virtual layers that may be located at different depths throughout the thickness of the disk and may be addressed individually by focusing the probe beam at the depth of each layer. The optical disk 12 is mounted on the spindle 36 (FIG. 1) with a spindle hole 56 so that the disk may be rotated around its axis. On each layer, the data may be generally written in a sequential spiraling track 58 from the outer edge of the disc 12 to an inner limit, although circular tracks, or other configurations, may be used.

Figure 3:
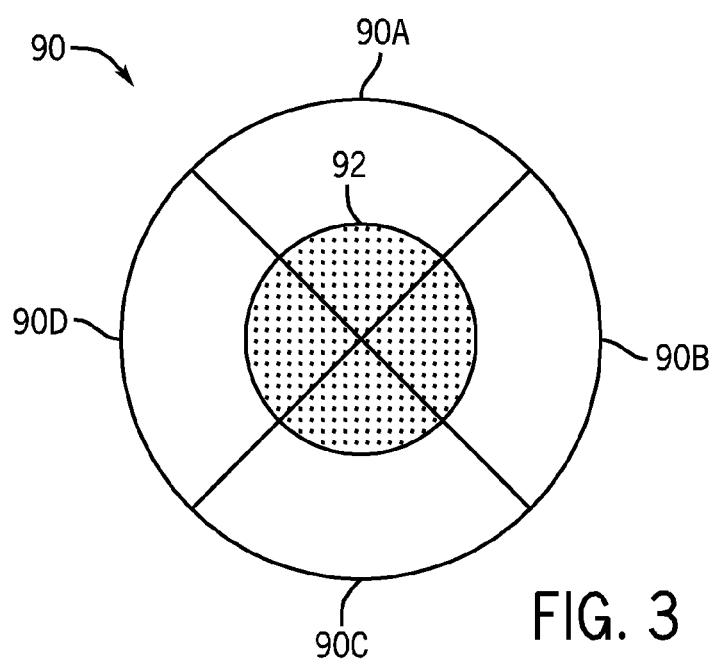
FIG. 3 is a diagrammatical representation of a detector configuration in accordance with embodiments of the present technique.

FIG. 3 shows a detector configuration or array for determining whether the system is on track. In one embodiment, a four quadrant detector 90 may be used to determine if the optical system is off-track. Each quadrant 90A, 90B, 90C, 90D of detector 90 generates a voltage that is proportional to the amount of energy reflected onto it. Detector 90 incorporates an array of photodiodes that each correspond to one of the quadrants, such as in the form of a quadrapole detector, for example, and is responsive to optical energy. See FIG. 6A for an orientation the detector with respect to the tracks (track/tangential direction along AB and CD and radial/off-track direction along AD and BC)]

Figure 4:
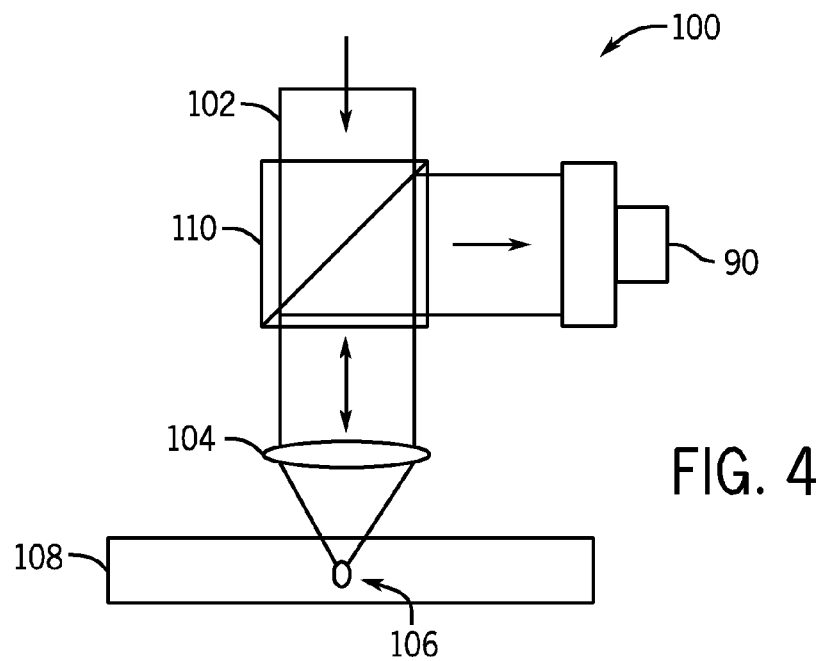
FIG. 4 is a diagrammatical representation of a detection head for reading a micro-hologram (micro-grating) memory device in accordance with embodiments of the present technique.
Figure 5:
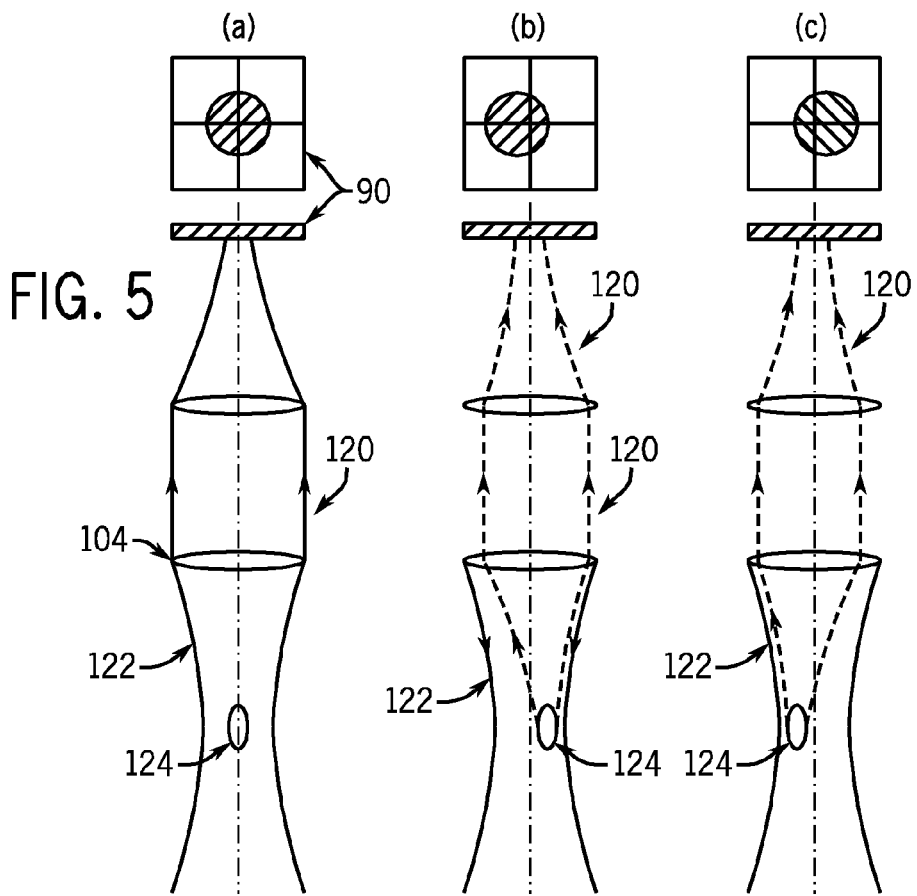
FIG. 5 is a diagrammatical representation of a deflection of a beam diffracted from a micro-grating with the reading beam centered on the grating and at the off-center incidence.

FIG. 4 shows a system 100 for detecting the presence or absence of a micro-hologram at a particular location within a medium, such as a spinning disc media. System 100 may be targeted to select volumes using the tracking and focusing mechanisms described herein. In the illustrated embodiment, a laser beam 102 is focused by a focusing optics 104 to impinge a target volume 106 within a media disc 108, through a beam-splitter 110. Light beam 102 may emanate from a conventional laser diode, such as those used in CD, DVD, and Blu-ray Disk™ players. Such a laser may take the form of a GaAs or GaN based diode laser, for example. Beam-splitter 110 may take the form of a polarizing cube beam splitter, for example. Focusing optics 104 may take the form of high numerical aperture focusing objective lensing, for example. Of course, other configurations are possible. Regardless of the particulars, where a micro-hologram is present in target volume 106, light beam 102 is reflected back though optics 104 to beam-splitter 110. Beam-splitter 110 re-directs the reflection to a detector (e.g., detector 90 of FIG. 3), which detects the presence or absence of a reflection. As mentioned and as discussed below, the detector 90 may also be used to interpret tracking information based on the reflection. Detector 90 may take the form of a photo-diode, or a photodiode array, such as the commercially available Hamamatsu Si Pin photodiode model S6795, for example FIG. 5 illustrates the diffracted beam 120 behavior when: (a) the reading beam 122 is precisely centered at the grating 124; (b) the beam 122 is shifted to the left of the grating 124; and (c) the beam 122 is shifted to the right of the grating 124. As the beam is collected on a multi-element photodetector (e.g., the quadrant photodiode detector 90 of FIG. 3) with collecting optics, the change in the beam propagation direction is expressed as a shift of the beam spot across the surface of the detector as the reading beam crosses the location of the micro-grating 124, which in turn can be extracted from the signals of each element of the detector 90 and shaped into a tracking error signal.

EXAMPLE

In one example, a 4-element amplified silicone photodiode was used as a photodetector for the signal beam 122 diffracted from the micro-gratings 124 recorded in a dye-doped injection-molded polycarbonate disc medium. The disc was mounted on a high precision 3D translation stage so that the micro-grating could be more precisely positioned with respect to the reading beam. Recording and readout were performed using a CW single-longitudinal mode laser at 532 nm wavelength and power of 100 µW to several mW for recording and 100 nW-1 µW for the probe beam. The numerical aperture was as low as ~0.1, and the diameter of the focused beam spot was around 3.6 µm. The diffraction efficiency of the recorded gratings was on the order of 0.1-1%. Linear combinations of the signals for the four detector elements (A, B, C, and D, oriented as shown in the inset FIG. 6A of FIG. 6) were obtained as the disc was scanned across a pre-recorded micro-grating at different off-track positions of the reading beam (0 and ±1 µm, for the plot in FIG. 6).

The combined signal (A+B+C+D) is the overall diffracted beam power incident on the detector. A reading beam precisely centered on a micro-grating results in equal signals in all channels A=B=C=D. The signal (A+D)−(B+C) deviates from zero whenever there is a disbalance between the signals on the left and right sides of the detector, i.e. along the track direction (tangential push-pull signal). The radial push-pull signal (A+B)−(C+D) depicted in FIG. 6 reflects the beam spot movement on the detector in the vertical direction (perpendicular to the track orientation). When the reading beam is misaligned from the track center, the beam will deviate from its backward direction and produce a non-zero (A+B)−(C+D), which can be used as the off-track error signal.

As illustrated in FIG. 6, the (A+B)−(C+D) tracking signal changes significantly as the beam is off from the track center. Curve 130 depicts (A+B)−(C+D) for a reading beam offset −1 µm (to the left) and curve 132 depicts (A+B)−(C+D) for a reading beam offset +1 µm (to the right) FIG. 7 depicts the S-curve response 140 describing the peak off-track error signal (A+B)−(C+D) as a function of beam displacement from the center of the track. The aforementioned tangential push-pull signal (A+D)−(B+C) can be used to detect the presence of the diffraction bit instead of the total intensity peaks signal (A+B+C+D). The push-pull signal edge is typically shaper than the width of the intensity profile, which may improve the spatial resolution between neighboring bits, as well as the precise grating position determination that can be used, for example, in a pulse-position modulation scheme.

Figure 8:
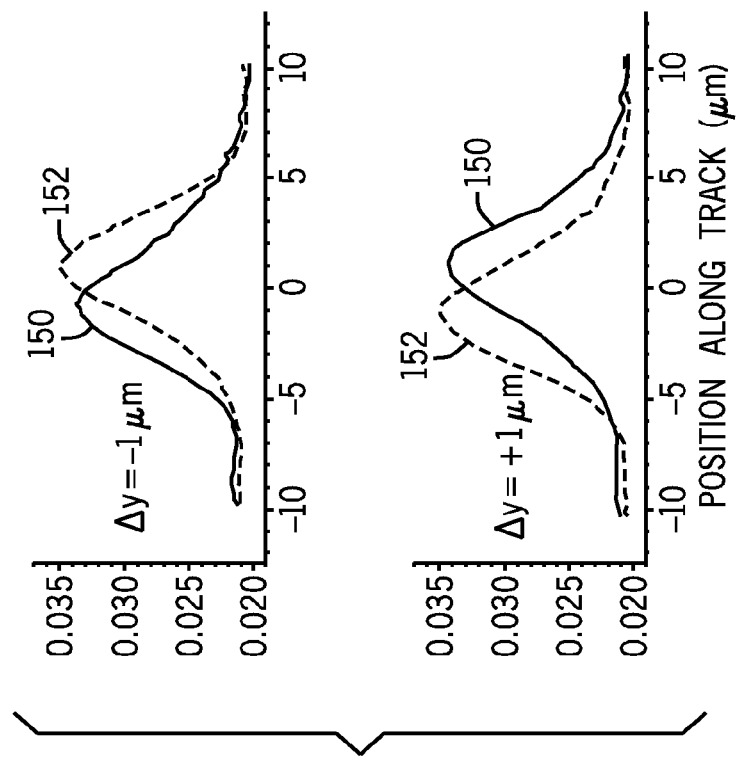
FIG. 8 is plots of experimental diagonal signals A+C and B+D from a single grating scanned along the tangential direction (track) for the probe beam off-track position of −1 μm and 1 μm in accordance with embodiments of the present technique.

Another approach to generate the tracking error signal from A, B, C, D detector signals is to monitor the diagonal differential phase, i.e., the phase difference between diagonal sum signals (A+C) and (B+D). FIG. 8 shows an example of such signals for the same micro-grating characterized in FIG. 6. Curves 150 represent A+C and curves 152 represent B+D. The off-track beam error is manifested through a relative shift between the peak positions in the two signals, which is equivalent to a delay in the time domain or the phase difference between the signals in the frequency domain. The peaks occur at the same beam position (time) if the beam is well centered on the grating. When the beam is off-track, the peaks of the two diagonal signals occur delayed with respect to one another with A+C being ahead of (behind) B+D for an off-track shift in the negative (positive) direction as shown in FIG. 8.

The two-peak separation distance is presented in FIG. 9 as a function of the beam off-track shift, resulting in another S-curve 160 that can be used as an off-track error signal in a servo loop control. The S-curve signals discussed with respect to FIGS. 7 and 9, for example, may be fed to the tracking servo to facilitate control of tracking actuators within a drive 10, for example. Practically, the phase difference between the two signals may be measured and reduced via a feedback loop (such as phase-locked loop or PLL). The phase measurement approach is generally more robust as the resulting error signal is independent on the signal amplitude, which drops off as the beam-grating overlap decreases, or due to possible variation in the signal level from bit to bit, for example.

FIG. 10 is an exemplary representation of plots 170 of signal (A+C) 172 and signal (B+D) 174 from a detector (e.g., detector 90) that may be used to determine a tracking (off-track) error signal via phase separation. The detector 90 may read a reflected data beam from the micro-hologram (i.e., grating) being read. The plots 170 demonstrate how the phase shift in diagonal signals from the detector may indicate the tracking error. The first plot at the top of FIG. 10 is indicative of the data beam being precisely centered on the micro-hologram being read (i.e., the data beam passing precisely through the center of the grating). The signal (A+C) 172 and signal (B+D) 174 behave the same, as indicated by the single curve 176. A vertical reference line 178 is positioned at the peaks 180 of the curve 176. In the case of the data beam being precisely centered on the micro-hologram, the signals 172 and 174 (i.e., the curve 176 is the overlapping diagonal signals 172 and 174) may represent maximum intensity sensed by the detector 90 from the reflected data beam. If measured against a clock carrier (which, for example, coincides with the peak positions of the holograms and are represented by vertical lines 178), both signals have a zero phase shift, which would be measured by a phase detector on each of the channels A+C and B+D.

The next two plots 170 show a phase differential $\phi$ 182 (between the signals 172 and 174) which is indicative of the amount of offset of a read or data beam not centered on the micro-hologram being read. The plots 170 are the signals (e.g., represented in voltage) over time in the scan direction. The vertical reference lines 178 may represent a clock, with the signals 172 and 174 before and after the clock. When the readout beam is off-track in one direction (the middle plot of FIG. 10), the signal A+C is advanced and the signal B+D is delayed with respect to the clock, and the phase detectors will measure a positive value for A+C and a negative value for B+D, or a positive relative phase shift $\phi$ 182 for A+C minus that of B+D. When the probe beam is off-track in the opposite radial direction (the bottom plot of FIG. 10), the situation is reversed and the phase measured is negative for A+C and positive for B+D signal, and the relative phase of A+C vs. B+D is negative. Thus, the phase of the signals 172 and 174 with respect to a clock, or of the relative phase difference $\phi$ 182 between the signals 172 and 174 with respect to each other may be detected and utilized to generate a tracking error signal (e.g., an S-curve based on phase shift $\phi$ 182 vs. probe beam position error dependence similar to that shown in FIG. 9).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling tracking in a holographic data storage system, comprising:
   impinging a beam on a holographic data disc, wherein the beam is reflected from a micro-hologram disposed within the holographic data disc, and wherein the micro-hologram is indicative of data stored on the holographic data disc;
   detecting the reflected beam from the holographic data disc by a multi-element detector; and
   analyzing a pattern detected by the multi-element detector to generate a tracking error signal.

2. The method of claim 1, wherein detecting the reflected beam comprises using a multi-element detector which comprises at least two elements.

3. The method of claim 1, wherein analyzing the pattern detected comprises generating a tracking error signal comprising an S-curve signal.

4. The method of claim 1, wherein detecting comprises detecting movement of the reflected beam on the multi-element detector from its nominal position.

5. The method of claim 4, wherein detecting movement comprises detecting movement of the reflected beam on the multi-element detector from its nominal position that occurs when the beam is misaligned with respect to a center of the micro-hologram.

6. The method of claim 1, wherein impinging the beam on the holographic data disk comprises impinging a data beam and wherein detecting the reflected beam from the holographic data disk comprises detecting a signal beam.

7. The method of claim 1, comprising inputting the tracking error signal to a tracking servo loop in a holographic data storage system.

8. The method of claim 1, wherein analyzing the pattern detected from the holographic data disc does not comprise analyzing a signal reflected from a separate tracking layer.

9. The method of claim 1, wherein analyzing the pattern detected from the holographic data disc does not comprise analyzing a signal reflected from a separate tracking layer of volume diffracting elements.

10. The method of claim 1, wherein analyzing the pattern detected from the holographic data disc does not comprise analyzing a signal reflected from grooves.

11. The method of claim 1, wherein impinging the beam on the holographic data disc comprises impinging the beam on a holographic data disk pre-formatted for recording of content.

12. The method of claim 1, wherein impinging the beam on the holographic data disc comprises impinging the beam on pre-recorded content.

13. A method of reading data from an optical data disk and controlling radial run out, comprising:
   spinning a holographic storage medium in an optical media drive;
   illuminating the holographic storage medium with a laser;
   reading a reflection beam from the medium via a detector;
   determining tracking error via detection of the reflection beam, wherein the tracking error is based on at least a read of a data micro-hologram in the holographic storage medium and a phase difference of reflection beam signals detected by the detector; and
   controlling the radial position of an optical pickup in the optical media drive based on the tracking error.

14. The method of claim 13, comprising extracting push-pull signals via the detector to determine the tracking error, wherein the detector comprises a multi-channel optical detector.

15. The method of claim 13, wherein controlling the radial position comprises feeding a signal of the tracking error to a tracking servo loop of the optical media drive.

16. The method of claim 15, wherein controlling the radial position comprises feeding an S-curve signal of the tracking error to the tracking servo loop.

17. The method of claim 13, wherein determining the tracking error comprises determining tracking error via detected amplitude or phase signals, or both.

18. The method of claim 13, wherein determining tracking error via detection of the reflection beam does not comprise determining tracking error based on a reflection of surface patterning for tracking.

19. The method of claim 13, wherein determining tracking error via detection of the reflection beam does not comprise determining tracking error based on a reflection of a servo layer for tracking.

20. An optical media drive comprising:
   an optical excitation device configured to focus a laser beam on a micro-hologram in an optical disc, wherein the micro-hologram is indicative of data stored on the optical disc;
   an optical detector configured to detect a reflected light beam from the micro-hologram in the optical disc;
   a converter configured to translate the optical detector signals into a tracking-error signal; and
   a tracking servo mechanism configured to control a radial position of the laser beam with respect to the optical disc, wherein the tracking servo mechanism is configured to receive the tracking error signal.

21. The drive of claim 20, wherein the tracking error signal comprises an S-curve signal.

22. The drive of claim 20, wherein the optical detector comprises at least two elements.

23. The drive of claim 20, wherein the optical media drive does not rely on additional surface patterning or other specialized servo layer in the optical disc to perform tracking.

* * * * *